United States Patent
Mikhemar et al.

(10) Patent No.: US 8,755,762 B2
(45) Date of Patent: Jun. 17, 2014

(54) RF RECEIVER WITH OSCILLATION BASED BLOCKER

(75) Inventors: Mohyee Mikhemar, Irvine, CA (US); Hooman Darabi, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 808 days.

(21) Appl. No.: 12/362,894

(22) Filed: Jan. 30, 2009

(65) Prior Publication Data

US 2010/0035573 A1  Feb. 11, 2010

Related U.S. Application Data

(60) Provisional application No. 61/086,308, filed on Aug. 5, 2008.

(51) Int. Cl.
*H04B 1/10* (2006.01)

(52) U.S. Cl.
USPC ........... 455/306; 455/302; 455/312; 455/311; 455/278.1; 375/349

(58) Field of Classification Search
USPC ........... 455/114.2, 278.1, 296–313, 337, 341, 455/342; 375/148, 346, 349, 351; 330/149; 340/572.1
See application file for complete search history.

(56) References Cited

U.S. PATENT DOCUMENTS

| | | | |
|---|---|---|---|
| 5,410,750 A * | 4/1995 | Cantwell et al. | 455/306 |
| 6,172,564 B1 * | 1/2001 | Rzyski | 330/149 |
| 7,058,368 B2 * | 6/2006 | Nicholls et al. | 455/114.2 |
| 7,697,914 B2 * | 4/2010 | Rofougaran | 455/305 |
| 2001/0043118 A1 * | 11/2001 | Suzuki et al. | 330/151 |
| 2006/0256010 A1 * | 11/2006 | Tanygin et al. | 342/443 |
| 2007/0001896 A1 * | 1/2007 | Hellsten | 342/25 D |
| 2009/0075612 A1 * | 3/2009 | Keehr et al. | 455/226.1 |
| 2010/0159858 A1 * | 6/2010 | Dent et al. | 455/131 |

* cited by examiner

*Primary Examiner* — Edward Urban
*Assistant Examiner* — Rui Hu
(74) *Attorney, Agent, or Firm* — Garlick & Markison; Edward J. Marshall

(57) ABSTRACT

A radio frequency (RF) receiver includes an amplifier stage, a blocking module, and a down conversion module. The amplifier stage amplifies an inbound RF signal (includes a desired component and a blocking component) to produce an amplified inbound RF signal. The blocking module generates an oscillation corresponding to a frequency of the blocking component and filters the amplified inbound RF signal based on the oscillation to substantially attenuate the blocking component and to pass, substantially unattenuated, the desired component. The down conversion module converts the desired RF signal component into a baseband or near baseband inbound signal.

18 Claims, 5 Drawing Sheets

RF RECEIVER WITH OSCILLATION BASED BLOCKER

CROSS REFERENCE TO RELATED PATENTS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Technical Field of the Invention

This invention relates generally to wireless communication systems and more particularly to radio frequency (RF) transceivers that operate in such systems.

2. Description of Related Art

Communication systems are known to support wireless and wire lined communications between wireless and/or wire lined communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, RFID, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In many radio transceiver applications, the transceiver operates in a full duplex module (i.e., capable of transmitting and receiving at the same time). Typically, the transmitter transmits on one carrier frequency in a given frequency band (e.g., 900 MHz, 1800 MHz, 1900 MHz, 2100 MHz, 2.4 GHz, 5 GHz, etc.) and the receiver receives on another carrier frequency in the frequency band. Despite using different frequencies, the signal strength of the transmitted signal is significantly greater than that of the received signal (e.g., by as much as 100 dB). As such, the receiver is susceptible to interference from the transmitted signal. To contain the interference, transceivers include a blocking circuit. There are numerous forms of blocking circuits, including duplexer, which can provide 50-60 dB of isolation between the transmitter and receiver. Duplexers, however, contain rather large inductors and capacitors, which requires them to be implemented off-chip from the transceiver. Other types of blocking circuits may have issues locking on to the blocking signal (i.e., the signal transmitted by the transmitter as received by the receiver).

Therefore, a need exists for a blocking circuit that can lock on to and substantially attenuate the blocking signal.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
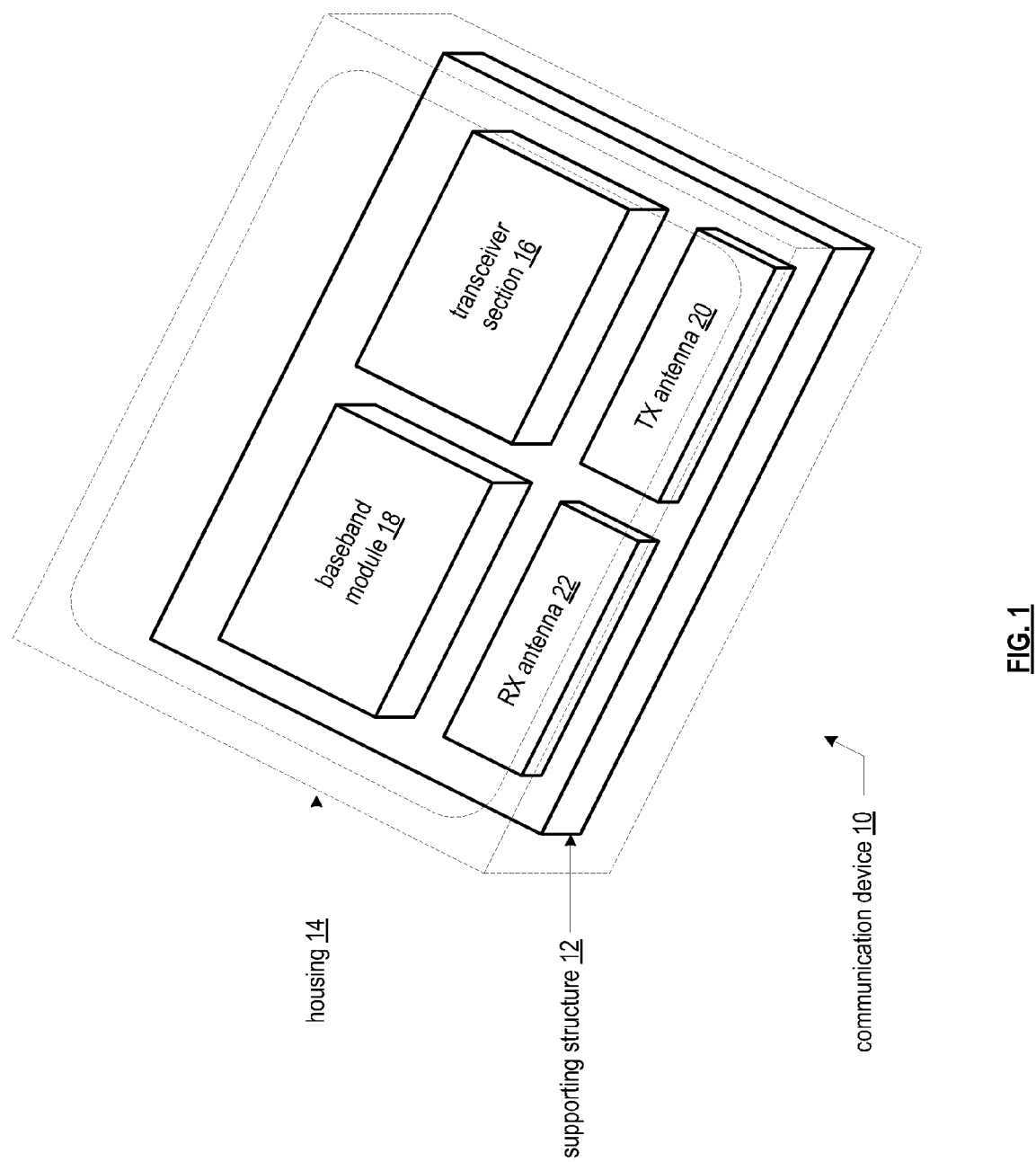
FIG. 1 is a diagram of an embodiment of a communication device in accordance with the present invention.

FIG. 1 is a diagram of an embodiment of a communication device 10 that includes a supporting structure 12 and a housing 14. The communication device 10 may be a cellular telephone, a personal digital assistant, a person media player (e.g., MP3 player), a laptop computer, a wireless local area network (WLAN) station, and/or any other device that transceives RF signals. The supporting structure 12 (which may be a printed circuit board, integrated circuit (IC) package substrate, and/or an IC die) supports a transceiver section 16, a baseband module 18, a transmitter antenna 20, and a receiver antenna 22. Alternatively, the transceiver section 16 may share an antenna. The transceiver section 16 and baseband module 18 may be implemented as separate ICs or implemented on the same IC.

The baseband module 18 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-5.

In operation, the transceiver section 16 receives and/or transmits RF signals in a frequency band (e.g., one or more of the 11 bands of WCDMA, 900 MHz, 1800 MHz, 1900 MHz, 2100 MHz, 2.4 GHz, 5 GHz, etc.). The transceiver section 16 converts an inbound RF signal into an inbound baseband (BB) or near baseband signal. The baseband module 18 converts the inbound baseband or near baseband signal (e.g., has a carrier frequency of DC or up to a few mega-Hertz) into inbound data in accordance with one or more protocols (e.g., BPSK, QPSK, m-QAM, FSK, GMSK, etc.) of one or more standards (e.g., WCDMA, CDMA, GSM, IEEE 802.11, etc.).

The baseband module 18 also converts outbound data into an outbound baseband or near baseband signal in accordance with the one or more protocols of the one or more standards. The transceiver section 16 converts the outbound baseband or near baseband signal into an outbound RF signal using one of the frequency bands. Note that the inbound and outbound data and may be voice, graphics, audio, video, text, and/or a combination thereof.

Figure 2:
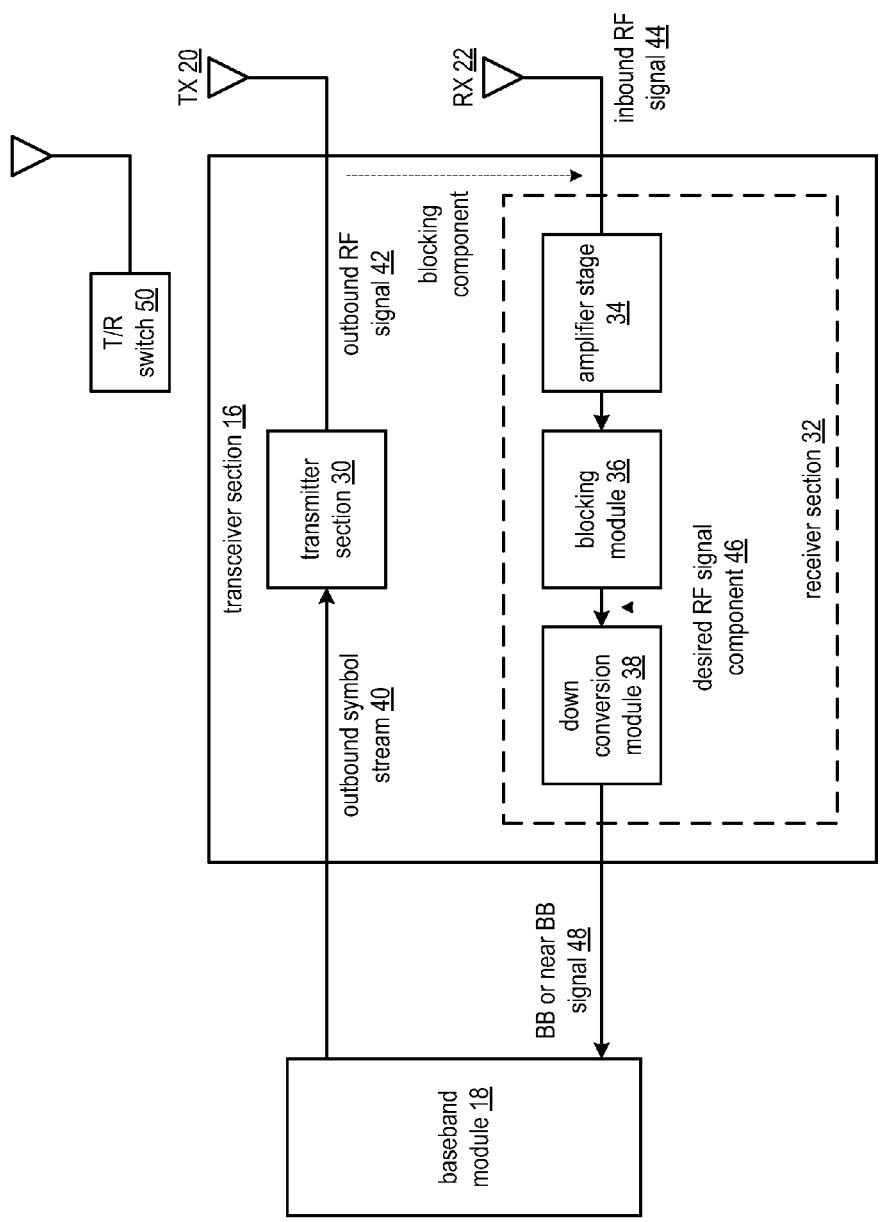
FIG. 2 is a schematic block diagram of an embodiment of a communication device in accordance with the present invention.

FIG. 2 is a schematic block diagram of an embodiment of a communication device 10 that includes the transceiver section 16 and the baseband module 18. The transceiver section 16 includes a transmitter section 30 coupled to the transmit antenna 20 and a receiver section 32 coupled to the receiver antenna 22. The receiver section 32 includes an amplifier stage 34, a blocking module 36, and a down conversion module 38. In an alternative embodiment, the transmitter section 30 and the receiver section 32 may share an antenna. If the sharing is done in a half duplex manner, the transmitter and receiver sections 30 and 32 would be coupled to the antenna via a transmit/receive (T/R) switch 50. For a full duplex mode, the transmitter and receiver sections 30 and 32 would be coupled to the antenna via an isolation circuit.

In this embodiment, the baseband module 18 converts outbound data into an outbound symbol stream 40 in accordance with one or more protocols of one or more standards. The RF transmitter section 30 converts an outbound symbol stream 40 into an outbound RF signal 42 that is transmitted via transmit antenna 20. The receiver section 32 converts an inbound RF signal 44, received via antenna 22, into a baseband or near baseband inbound signal 48. The baseband module 18 converts the baseband or near baseband inbound signal 48 into inbound data in accordance with the one or more protocols of the one or more standards.

An amplifier stage 34, which may include one or more low noise amplifiers, receives an inbound RF signal 44 that includes a desired RF signal component and a blocking signal component. The blocking signal component corresponds to the outbound RF signal transmitted by the transmitter section 30 as received by the amplifier stage 34. The amplifier stage 34 amplifies the inbound RF signal 44 to produce an amplified inbound RF signal.

The blocking module 36 generates an oscillation corresponding to a frequency of the blocking signal component. For example, if 1920-1980 MHz is used for uplink communications (e.g., transmitter) and 2110-2170 MHz is used for downlink communications (e.g., receiver), the blocking module 36 generates an oscillation at a rate of 1920-1980 MHz. The blocking module 36 then filters the amplified inbound RF signal based on the oscillation to substantially attenuate the blocking signal component and to pass, substantially unattenuated, the desired RF signal component 46.

The down conversion module 38 converts the desired RF signal component 46 into the baseband or near baseband inbound signal 48. In an embodiment, the down conversion module 38 mixes in-phase (I) and quadrature (Q) components of the desired RF signal component 46 with in-phase and quadrature components of a receiver local oscillation to produce a mixed I signal and a mixed Q signal for each component of the desired RF signal component 46. Each pair of the mixed I and Q signals are combined to produce the first and second inbound symbol streams of the baseband or near baseband signal 48. In this embodiment, each of the first and second inbound symbol streams includes phase information (e.g., $-/+\Delta\theta$ [phase shift] and/or $\theta(t)$ [phase modulation]) and/or frequency information (e.g., $-/+\Delta f$ [frequency shift] and/or $f(t)$ [frequency modulation]). In another embodiment and/or in furtherance of the preceding embodiment, the inbound RF signal includes amplitude information (e.g., $-/+\Delta A$ [amplitude shift] and/or $A(t)$ [amplitude modulation]). To recover the amplitude information, the down conversion module 38 further includes an amplitude detector such as an envelope detector, a low pass filter, etc.

Figure 3:
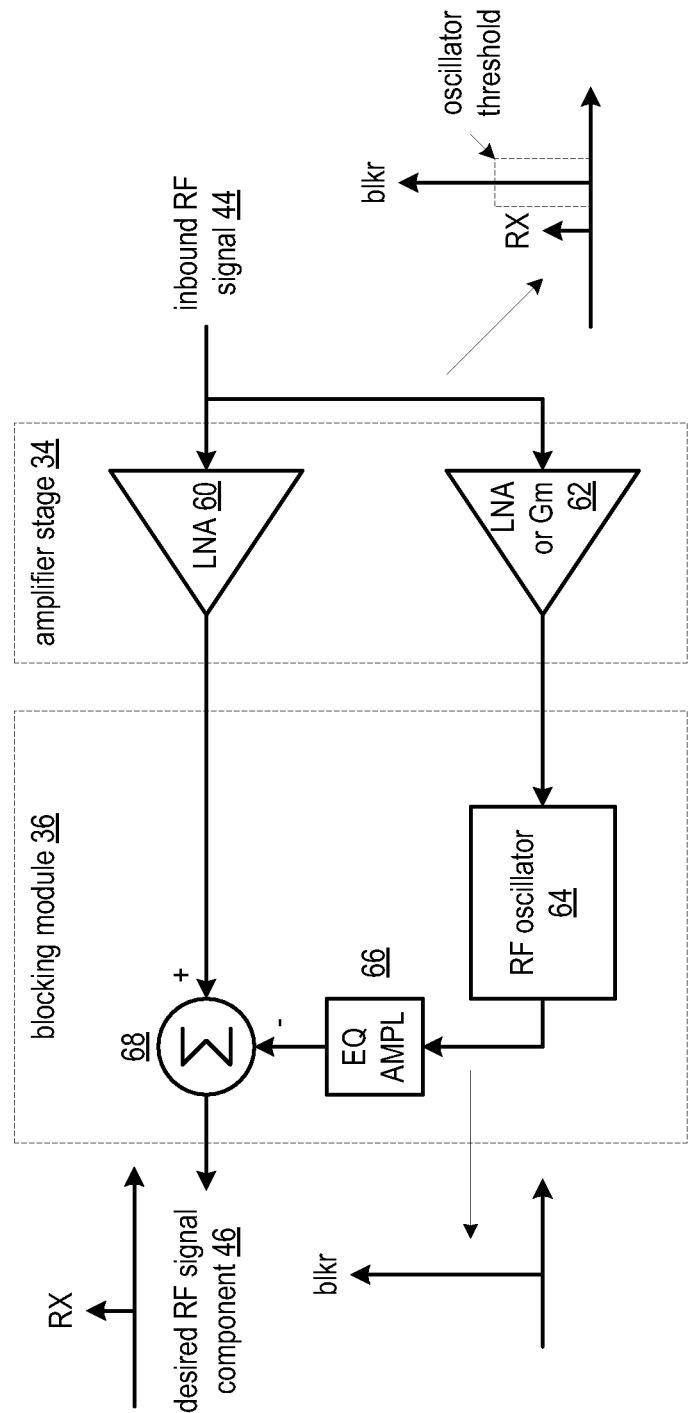
FIG. 3 is a schematic block diagram of an embodiment of an amplifier stage and a blocking module in accordance with the present invention.

FIG. 3 is a schematic block diagram of an embodiment of an amplifier stage 60 and a blocking module 36. In an embodiment, the amplifier stage 60 includes a first low noise amplifier 60 coupled to amplify the inbound RF signal 44 to produce a first amplified inbound RF signal and a second low noise amplifier 62 coupled to amplify the inbound RF signal to produce a second amplified inbound RF signal. In an alternate embodiment, the amplifier stage 34 includes the low noise amplifier 60 and a transconductance amplifier 62 coupled to amplify the inbound RF signal to produce a second amplified inbound RF signal. As shown, the inbound RF signal 44 includes a blocking component (blkr) and a desired signal component (RX).

The blocking module includes an RF oscillator 64 and a subtraction module 68 and may further include an amplitude equalizer 66. The RF oscillator 64 generates the oscillation based on the frequency of the blocking signal component. The RF oscillator 64 may be a locked voltage controlled oscillator (VCO), a phase locked loop, a frequency synthesizer, and/or a ring oscillator. The RF oscillator 64 may have a locking range that includes the blocker signal component and does not include the desired signal component. As such, the resulting oscillation will be locked to blocking signal component. If included, the amplitude equalizer 66 adjusts the amplitude of oscillation to substantially match the amplitude of the amplified inbound RF signal produced by the low noise amplifier 60.

The subtraction module 68 subtracts the oscillation from the amplified inbound RF signal to produce the resulting RF signal component 46. As graphically shown, the inbound RF signal 44 includes the desired signal component (RX) and the blocking signal component (blkr). The RF oscillator 64 produces an oscillation (blkr) that has a frequency corresponding to that of the blocking signal component. When the oscillation is subtracted from the amplified inbound RF signal 44, the resulting signal includes the desired signal component (RX) 46.

Figure 4:
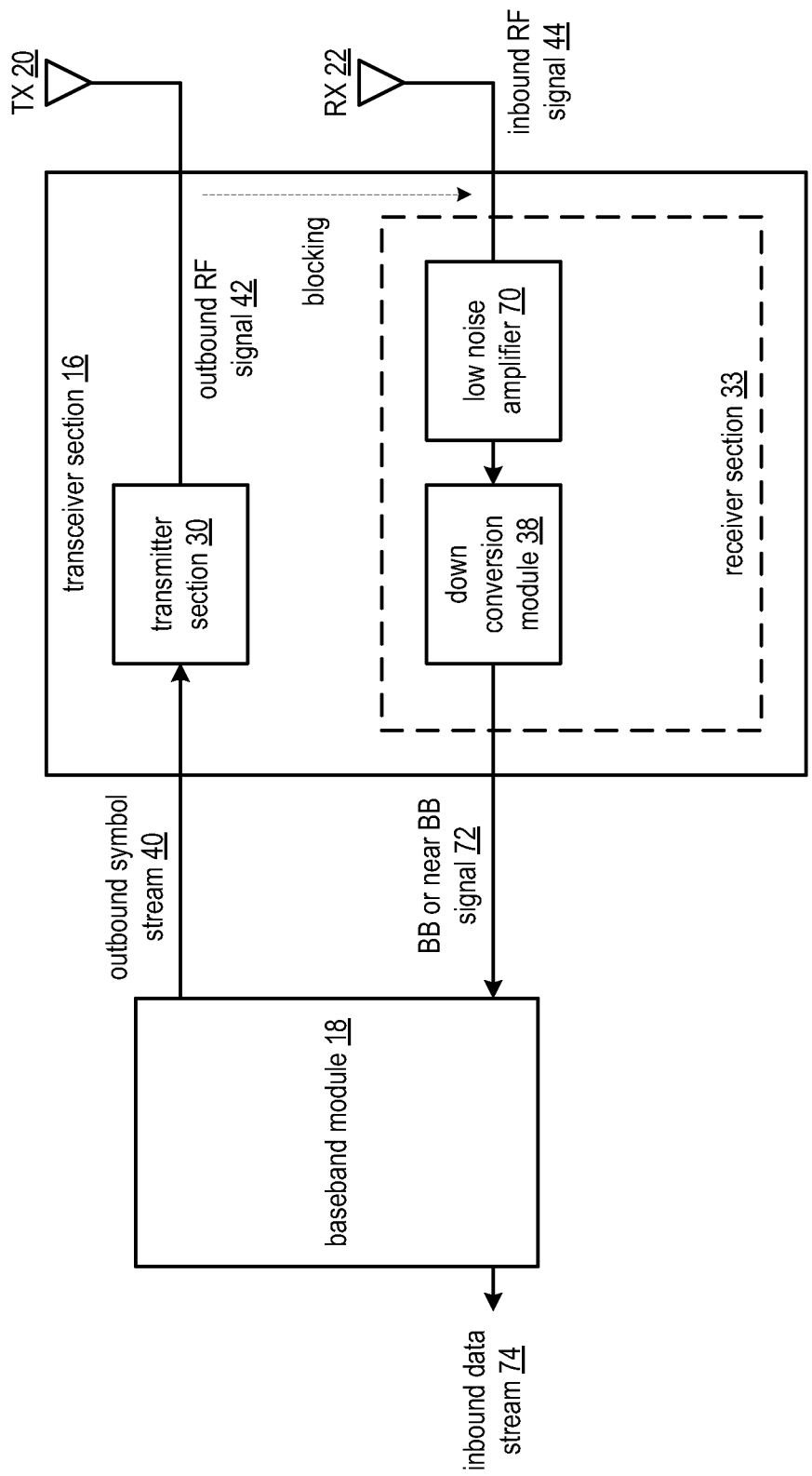
FIG. 4 is a schematic block diagram of another embodiment of a communication device in accordance with the present invention.

FIG. 4 is a schematic block diagram of another embodiment of a communication device 10 that includes the transceiver section 16 and the baseband module 18. The transceiver section 16 includes a transmitter section 30 coupled to the transmit antenna 20 and a receiver section 33 coupled to the receiver antenna 22. The receiver section 32 includes a low noise amplifier 70 and a down conversion module 38. In an alternative embodiment, the transmitter section 30 and the receiver section 33 may share an antenna. If the sharing is done in a half duplex manner, the transmitter and receiver sections 30 and 33 would be coupled to the antenna via a transmit/receive (T/R) switch 50. For a full duplex mode, the transmitter and receiver sections 30 and 33 would be coupled to the antenna via an isolation circuit.

In this embodiment, the low noise amplifier 70 amplifies an inbound RF signal 44 (which includes desired signal component and a blocking signal component) to produce an amplified inbound RF signal. The down conversion module 38 converts the amplified inbound RF signal into a baseband or near baseband signal 72, which includes a desired baseband signal component and a baseband blocking signal component.

The baseband module 18 generates an oscillation corresponding to a frequency of the baseband blocking signal component. The baseband module 18 then filters the baseband or near baseband signal based on the oscillation to substantially attenuate the baseband blocking signal component and to pass, substantially unattenuated, the desired baseband signal component. The baseband module 18 then converts the desired baseband signal component into an inbound data stream 74 in accordance with one or more protocols of one or more standards.

Figure 5:
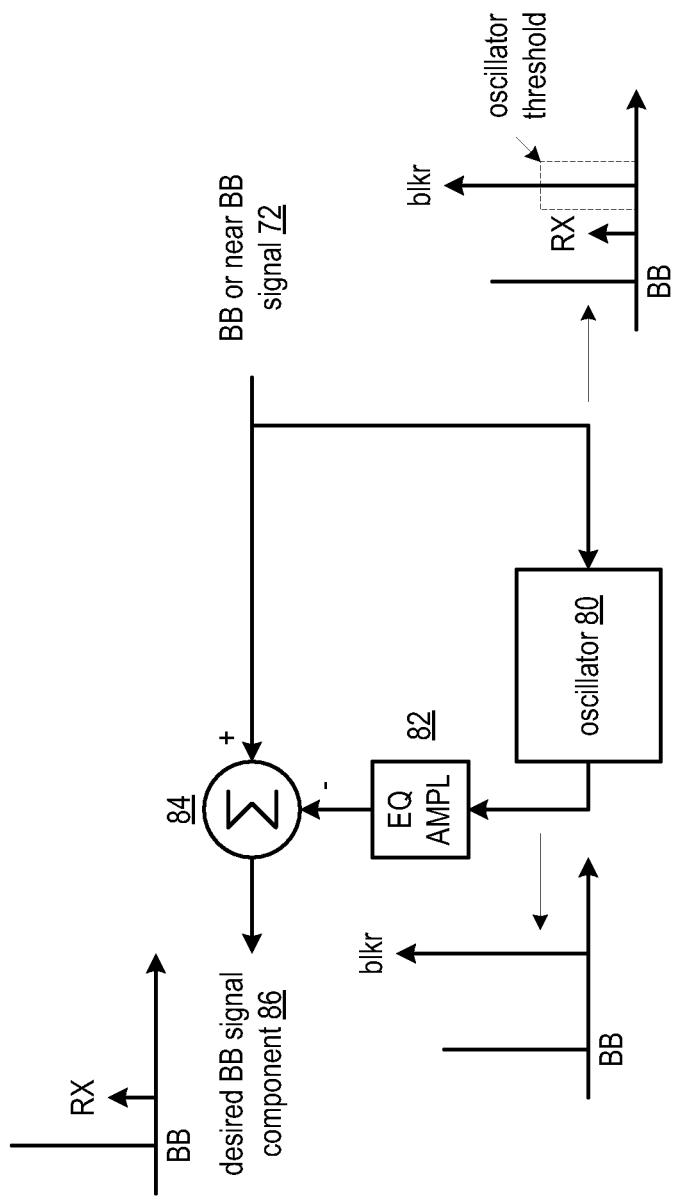
FIG. 5 is a schematic block diagram of an embodiment of a baseband blocking module in accordance with the present invention.

FIG. 5 is a schematic block diagram of an embodiment of a baseband blocking module within the baseband module 18 that includes an oscillator 80 and a subtraction module 84 and may further include an amplitude equalizer 82. The oscillator 80 generates the oscillation based on the frequency of the blocking signal component of the baseband or near baseband signal 72. The oscillator 80 may be a locked voltage controlled oscillator (VCO), a phase locked loop, a frequency synthesizer, and/or a ring oscillator. The oscillator 80 may have a locking range that includes the baseband blocker signal component and does not include the baseband desired signal component. As such, the resulting oscillation will be locked to the baseband blocking signal component. If included, the amplitude equalizer 82 adjusts the amplitude of oscillation to substantially match the amplitude of the baseband or near baseband signal 72.

The subtraction module 82 subtracts the oscillation from the baseband or near baseband signal 72 to produce the resulting baseband signal component 86. As graphically shown, the baseband or near baseband signal 72 includes the baseband desired signal component (RX) and the baseband blocking signal component (blkr). The oscillator 80 produces an oscillation (blkr) that has a frequency corresponding to that of the baseband blocking signal component. When the oscillation is subtracted from the baseband or near baseband signal 72, the resulting signal includes the desired baseband signal component (RX) 86.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A radio frequency (RF) receiver comprises:
an amplifier stage coupled to amplify an inbound RF signal to produce both a first amplified inbound RF signal and a second amplified inbound RF signal, wherein the inbound RF signal, the first amplified inbound RF signal, and the second amplified inbound RF signal include a desired RF signal component and a blocking signal component generated by a known RF transmitter having a known transmission frequency, the amplifier stage including:
a first low noise amplifier coupled in parallel with a second low noise amplifier, the first low noise amplifier configured to amplify the inbound RF signal to produce the first amplified inbound RF signal; and
the second low noise amplifier configured to amplify the inbound RF signal to produce the second amplified inbound RF signal;
a blocking module coupled to the amplifier stage, wherein the blocking module functions to:
generate, based on the known transmission frequency of the known RF transmitter, an oscillation corresponding to a known frequency of the blocking signal component;
lock the oscillation onto the blocking signal component of the second amplified inbound RF signal;
filter the first amplified inbound RF signal based on the oscillation to substantially attenuate the blocking signal component and to pass, substantially unattenuated, the desired RF signal component; and
a down conversion module coupled to convert the desired RF signal component into a baseband or near baseband inbound signal.

2. The RF receiver of claim 1, wherein the amplifier stage comprises:
a low noise amplifier coupled in parallel with a transconductance amplifier, the low noise amplifier configured to amplify the inbound RF signal to produce the first amplified inbound RF signal; and
the transconductance amplifier configured to amplify the inbound RF signal to produce the second amplified inbound RF signal.

3. The RF receiver of claim 1, wherein the blocking module comprises:
an RF oscillator coupled to generate the oscillation based on the known frequency of the blocking signal component; and
a subtraction module coupled to subtract the oscillation from the first amplified inbound RF signal.

4. The RF receiver of claim 3, wherein the blocking module further comprises:
an amplitude equalizing module coupled to adjust amplitude of the oscillation prior to subtraction by the subtraction module.

5. The RF receiver of claim 3, wherein the RF oscillator comprises at least one of:
a controlled oscillator;
a phase locked loop; and
a ring oscillator.

6. The RF receiver of claim 5, wherein the controlled oscillator comprises:
a narrow band controlled oscillator having a frequency locking range that includes the known frequency of the RF transmitter that generated the blocking signal component, but does not include the frequency of the desired RF signal component.

7. A radio frequency (RF) transceiver comprises:
an RF transmitter section coupled to convert an outbound symbol stream into an outbound RF signal;
a RF receiver section coupled to convert an inbound RF signal into a baseband or near baseband inbound signal, wherein the RF receiver section includes:
an amplifier stage coupled to amplify an inbound RF signal to produce an amplified inbound RF signal coupled to amplify an inbound RF signal to produce both a first amplified inbound RF signal and a second amplified inbound RF signal, wherein the inbound RF signal, the first amplified inbound RF signal, and the second amplified inbound RF include a desired RF signal component and a blocking signal component generated by the RF transmitter section and having a known transmission frequency, the amplifier stage including:
a first low noise amplifier coupled in parallel with a second low noise amplifier, the first low noise amplifier configured to amplify the inbound RF signal to produce the first amplified inbound RF signal; and
the second low noise amplifier configured to amplify the inbound RF signal to produce the second amplified inbound RF signal;
a blocking module coupled to the amplifier stage, wherein the blocking module functions to:
generate an oscillation corresponding to a known frequency of the blocking signal component;
lock the oscillation onto the blocking signal component of the second amplified inbound RF signal;
filter the first amplified inbound RF signal based on the oscillation to substantially attenuate the blocking signal component and to pass, substantially unattenuated, the desired RF signal component; and
a down conversion module coupled to convert the desired RF signal component into the baseband or near baseband inbound signal.

8. The RF transceiver of claim 7, wherein the amplifier stage comprises:
a low noise amplifier coupled in parallel with a transconductance amplifier, the low noise amplifier configured to amplify the inbound RF signal to produce the first amplified inbound RF signal; and
the transconductance amplifier configured to amplify the inbound RF signal to produce the second amplified inbound RF signal.

9. The RF transceiver of claim 7, wherein the blocking module comprises:
an RF oscillator coupled to generate the oscillation based on the known frequency of the blocking signal component; and
a subtraction module coupled to subtract the oscillation from the first amplified inbound RF signal.

10. The RF transceiver of claim 9, wherein the blocking module further comprises:
an amplitude equalizing module coupled to adjust amplitude of the oscillation prior to subtraction by the subtraction module.

11. The RF transceiver of claim 7, wherein the blocking module comprises:
a narrow band controlled oscillator having a frequency locking range that includes the known frequency of the known RF transmitter section that generated the blocking signal component, but does not include the frequency of the desired RF signal component.

12. The RF transceiver of claim 7 further comprises:
a transmit/receive switch coupled to the RF transmitter section, the RF receiver section, and a shared antenna.

13. The RF transceiver of claim 7 further comprises:
a receiver antenna interface coupled to the RF receiver section; and
a transmitter antenna interface coupled to the RF transmitter section.

14. A radio frequency (RF) receiver comprises:
a low noise amplifier coupled to amplify an inbound RF signal to produce an amplified inbound RF signal, wherein the inbound RF signal includes a desired signal component and a blocking signal component generated by a known RF transmitter having a known transmission frequency;
a down conversion module coupled to convert the amplified inbound RF signal into a baseband or near baseband signal, wherein the baseband or near baseband signal includes a desired baseband signal component and a baseband blocking signal component representing a baseband signal generated by the known RF transmitter having a known transmission frequency;
a baseband module comprising:
a controlled oscillator having a frequency locking range that includes a frequency of the baseband blocking signal component but does not include a frequency of the desired baseband signal component, the narrow band controlled oscillator configured to generate an oscillation corresponding to a predetermined frequency of the baseband blocking signal component;
a filter configured to filter the baseband or near baseband signal based on the oscillation to substantially attenuate the baseband blocking signal component and to pass, substantially unattenuated, the desired baseband signal component, and filter the desired baseband signal component into an inbound data stream.

15. The RF receiver of claim 14, wherein the baseband module comprises:
an oscillator coupled to generate the oscillation based on the predetermined frequency of the baseband blocking signal component; and
a subtraction module coupled to subtract the oscillation from the baseband or near baseband inbound signal.

16. The RF receiver of claim 15, wherein the baseband module further comprises:
an amplitude equalizing module coupled to adjust amplitude of the oscillation prior to subtraction by the subtraction module.

17. The RF receiver of claim 15, wherein the oscillation comprises at least one of:
a controlled oscillator;
a phase locked loop;
a digital frequency synthesizer; and
a ring oscillator.

18. The RF receiver of claim 17, wherein the controlled oscillator comprises:
a narrow band controlled oscillator, configured to lock onto signals within a frequency range determined by the known frequency of the known RF transmitter that generated the blocking signal component.

* * * * *

UNITED STATES PATENT AND TRADEMARK OFFICE
CERTIFICATE OF CORRECTION

PATENT NO.        : 8,755,762 B2                                    Page 1 of 1
APPLICATION NO.   : 12/362894
DATED             : June 17, 2014
INVENTOR(S)       : Mikhemar et al.

It is certified that error appears in the above-identified patent and that said Letters Patent is hereby corrected as shown below:

In The Claims

Col. 8, lines 35-36, in claim 7: after "an amplifier stage" delete "coupled to amplify an inbound RF signal to produce an amplified inbound RF signal"

Col. 8, line 41, in claim 7: after "second amplified inbound RF" insert --signal--

Signed and Sealed this
Twenty-sixth Day of May, 2015

Michelle K. Lee
*Director of the United States Patent and Trademark Office*